Feb. 17, 1953 P. A. RAMSEY 2,628,548
DRAG CONTROLLED MEANS FOR RAISING THE
BLADES OF GANG TYPE DISK PLOWS
Filed Jan. 29, 1952
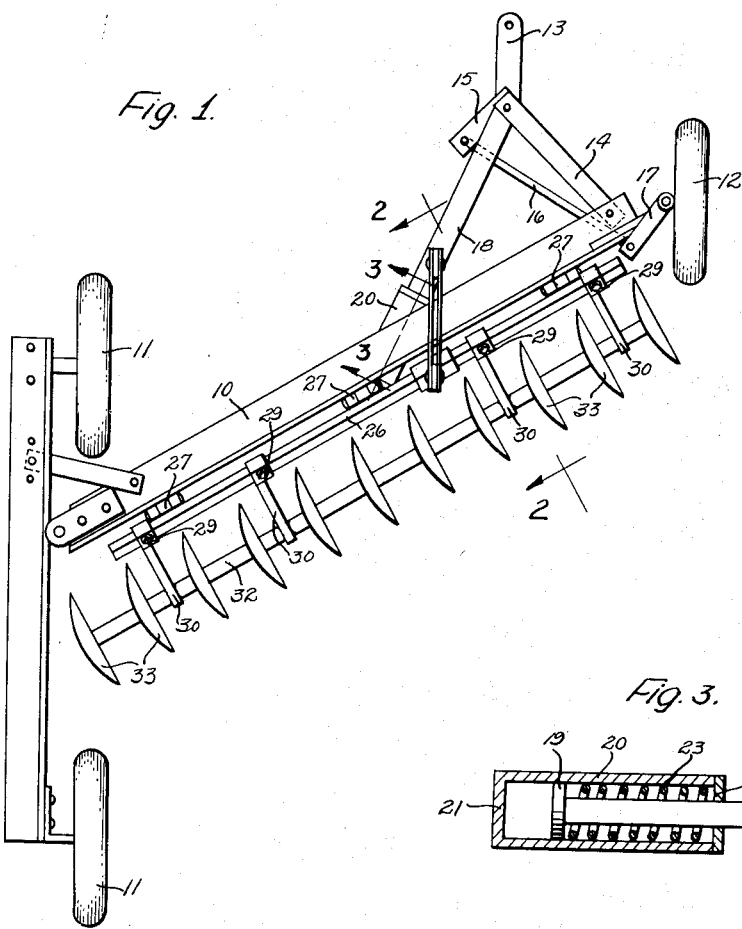
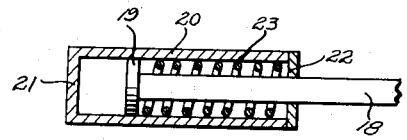
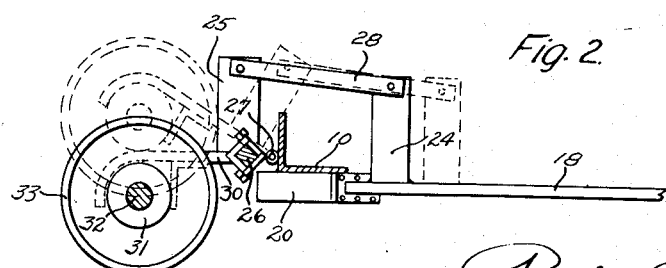
INVENTOR
Paul A. Ramsey Patented Feb. 17, 1953

2,628,548

UNITED STATES PATENT OFFICE 2,628,548

DRAG CONTROLLED MEANS FOR RAISING THE BLADES OF GANG TYPE DISK PLOWS

Paul A. Ramsey, Altoona, Kans.

Application January 29, 1952, Serial No. 268,731

1 Claim. (Cl. 97—53)

The present invention relates to a drag controlled means for raising the blades of a gang-type disc plow and it consists in the combinations, constructions and arrangements of parts herein described and claimed.

Generally there is provided a disc plow of the "gang" type and which is provided with a frame having three supporting wheels and supported by the frame a shaft upon which is mounted a plurality of spaced discs. The shaft is mounted in a plurality of spaced arms whose inner ends are attached to a torque shaft which runs parallel to the shaft upon which the discs are mounted and which torque shaft is pivotally connected to the frame. A hitch member is connected to the frame by means of a compression member and also has attached thereto a vertically extending arm. The torque shaft is provided with a vertically extending arm and the two vertically extending arms are interconnected by a link. The device is such that as stones or other objects are encountered by the discs a greater tension is placed upon the compression member and consequently through the vertically extending arms and the link interconnecting the same, the torque shaft is rotated thereby to lift the discs upwardly away from the earth. Such lifting will be in direct proportion to the amount of drag encountered by the discs and it is to be understood that the device is utilized in a machine of the character set forth in conjunction with the regular raising and lowering means conventionally found in such machines.

It is accordingly an object of the invention to provide a novel means for raising and lowering a plurality of discs in a disc plow, in direct proportion to the amount of drag encountered thereby.

Another object of the invention is to provide, in a device of the character set forth, a novel compressible member forming a part of the invention.

Another object of the invention is the provision, in a device of the character set forth, of a novel torque arm and associated parts forming a part of the invention.

A further object of the invention is to provide a device of the character set forth which is simple in construction, inexpensive to manufacture and yet effective and efficient in use.

Other and further objects of the invention will become apparent from a reading of the following specification taken in conjunction with the drawing, in which:

Figure 1 is a plan view of an embodiment of the invention.

Figure 2 is a sectional view taken substantially along line 2—2 of Figure 1, and Figure 3 is an enlarged fragmentary sectional view taken substantially along line 3—3 of Figure 1.

Referring more particularly to the drawing, there is shown therein a "gang" type disc plow having a frame 10 provided with a pair of fixed supporting wheels 11 and a dirigible supporting wheel 12. A draw bar 13 is connected by a link 14 to the frame 10 and is provided with an extension 15 which is connected by a link 16 to a steering arm 17 for the wheel 12.

Also connected to the draw bar 13 is a hitch member 18 whose rearward end is provided with a head 19 which is slidably mounted in a cylinder 20 which is provided with closed ends 21 and 22, the hitch member 18 extending slidably through the end 22, as shown in Figure 3. A compression spring 23 is mounted within the cylinder 20 and bears against the head 19 at one end and against the closed end 22 at its other end.

A vertically extending arm 24 is affixed to the hitch member 18 and a like arm 25 is affixed to a torque shaft 26 which is hingedly connected, as indicated at 27, to the frame 10. The upper ends of the arms 24 and 25 are interconnected by a link 28.

Affixed at spaced intervals to the torque shaft 26, as indicated at 29, is a plurality of horizontally extending arms 30 the rearward ends of which carry bearings 31 through which extends a plow shaft 32 upon which is mounted a plurality of spaced plow discs 33.

In operation, it will be apparent that as the machine is moved forwardly and the disc 33 lowered by the conventional mechanism to engage the ground over which the machine is passing, that as obstructions are encountered by the discs 33 the drag will become greater and hence the hitch member 18 will be drawn forwardly out of the cylinder 20 against the action of the spring 23. This will cause a relative forward movement of the arm 24 and consequently the link 28 which will act to pivot the torque shaft 26 in a clockwise direction as viewed in Figure 2 and as clearly shown by the dotted lines in that figure. This action will cause the discs 33 to be raised from the ground and it will be readily apparent that the amount of such raising of the discs 33 will be directly governed by the amount of drag upon the member 18 due to the discs 33 encountering stones and other objects. Likewise it will be seen that as the ground itself becomes more dense, the blades or discs 33 will be raised proportionately and that as the ground becomes softer the blades will be allowed to bite deeper into such earth.

While but one form of the invention has been shown and described herein, it will be readily apparent to those skilled in the art that many minor modifications may be made without departing from the spirit of the invention or the scope of the appended claim.

What is claimed is:

A device of the character described comprising a frame, supporting wheel for said frame, a torque shaft hinged to said frame, supporting arms extending rearwardly from said torque shaft, a plow shaft carried by the rear ends of said supporting arms, a plurality of plow discs mounted in spaced relation on said plow shaft, and yieldable means for moving said torque shaft whereby to move said discs upwardly, said means including an upwardly extending vertical arm affixed to said torque shaft, a hitch member, an upwardly extending vertical arm affixed to said hitch member, a link interconnecting said vertical arms, and a yieldable member interconnecting said frame and said hitch member, said yieldable member comprising a cylinder affixed to said frame, a head mounted at the rear end of said hitch member and slidable in said cylinder, said cylinder having closed ends through one of which said hitch member is slidable, and a compression spring surrounding said hitch member within said cylinder and bearing against said head at one end and at its other end against that closed end of the cylinder through which said hitch member extends.

PAUL A. RAMSEY.

REFERENCES CITED

The following references are of record in the file of this patent:

UNITED STATES PATENTS

| Number | Name | Date |
|---|---|---|
| 1,273,069 | Keckritz | July 16, 1918 |
| 1,417,381 | Hengst | May 23, 1922 |
| 2,426,354 | Johnston | Aug. 26, 1947 |

FOREIGN PATENTS

| Number | Country | Date |
|---|---|---|
| 360,012 | Germany | Sept. 28, 1922 |